United States Patent

[11] 3,579,213

[72] Inventor Roy A. Applequist
San Jose, Calif.
[21] Appl. No. 722,007
[22] Filed Apr. 17, 1968
[45] Patented May 18, 1971
[73] Assignee International Business Machines Corporation
Armonk, N.Y.

[54] MAGNETIC HEAD ACCESSING MECHANISM UTILIZING SPRING BIAS
4 Claims, 4 Drawing Figs.

[52] U.S. Cl. .......... 340/174.1E
179/100.2I
[51] Int. Cl. .......... G11b 5/60
[50] Field of Search .......... 340/179.1
(E), 174.1 (C); 179/100.2 (P), 100.2 (CA)

[56] References Cited

UNITED STATES PATENTS

| | | | |
|---|---|---|---|
| 3,317,903 | 5/1967 | Eckert et al. .......... | 340/174.1 |
| 3,183,516 | 5/1965 | Sliter .......... | 340/174.1 |
| 3,368,210 | 2/1968 | Zimmer .......... | 340/174.1 |

*Primary Examiner*—Bernard Konick
*Assistant Examiner*—Vincent P. Canney
*Attorneys*—Hanifin & Clark and Nathan N. Kallman

ABSTRACT: A magnetic head support assembly, particularly useful for noncontact recording, includes a head support arm formed with a spring-loaded portion, and incorporates a ramp that cooperates with a stationary cam to effectuate proper loading of the head to a magnetic record surface. The support arm may be actuated bidirectionally, so that the magnetic transducer is precisely positioned at a desired track and properly spaced from the surface of the record medium or disc during record and playback, or retracted to a rest position.

PATENTED MAY 18 1971 3,579,213

INVENTOR.
ROY A. APPLEQUIST

BY Nathan N. Kallman
ATTORNEY

MAGNETIC HEAD ACCESSING MECHANISM UTILIZING SPRING BIAS

BACKGROUND OF THE INVENTION

1. Field of the Invention

This invention relates to a novel and improved magnetic head arm assembly, and in particular to an assembly that affords proper positioning, spacing and attitude of a magnetic transducer with reference to a storage medium in a noncontact recording relation.

2. Description of the Prior Art

In some presently known storage systems, such as magnetic disc files, recording and playback are achieved by a noncontact recording technique. In such an approach, a magnetic transducer or head is spaced from the storage medium or disc, whereby wear and degradation of the recording surface of the medium and of the transducer are avoided. To this end, magnetic heads incorporating an air bearing surface, known as flying heads or gliding heads are employed. The flying head is generally formed with a slider assembly that allows transport of the transducer to and from selected tracks of the storage medium.

With the increasing necessity for higher density storage, there is a tendency to make the width of the data tracks on the medium and the corresponding length of the transducing gap narrower, while the magnetic coating of the storage medium is being made thinner. As a result, the positioning and attitude of the transducer relative to the recording medium, and the spacing of the transducer and its sensing gap from the magnetic coating surface become more critical.

In known magnetic head assemblies of the slider type, a substantial number of parts are utilized to maintain the position and stability of a magnetic transducer during the flying process, while recording or reproducing data. For example, torsion rods, cranks, armature and magnet assemblies, pawls, cams, cam latches and followers, and other parts are used to accomplish stable, reliable noncontact transducing relation. Some of these parts require adjustments, maintenance and repair, inter alia, and add to the expense and cost of the apparatus. It would be desirable to have a simplified and relatively inexpensive assembly that affords suitable head to medium spacing characterized by close head load tolerance, and minimizes head-to-disc damage that may occur during head loading.

SUMMARY OF THE INVENTION

An object of this invention is to provide a novel and improved magnetic head support assembly useful for noncontact recording.

Another object of this invention is to provide a head assembly that affords a desired loading force, with a resultant correct positioning and spacing of a transducer relative to data tracks of a storage medium being scanned.

According to this invention, a magnetic head arm assembly useful in access type storage file systems incorporates a head support structure having a magnetic transducer at one end. In the flying or gliding mode, the arm assembly and transducer are extended or advanced to traverse a storage medium, such as a magnetic disc; while in the nonoperative mode, the head arm assembly is retracted from the storage medium to a rest position.

The arm assembly is spring-loaded so that during the operative, head gliding mode, a spring force urges the head or transducer assembly towards the disc. This force is counterbalanced by an air bearing or hydrodynamic effect developed between the flying head and the moving medium or rotating disc. During retraction, a ramp formed in the arm assembly cooperates with a stationary cam that lifts the arm assembly away from the disc surface, and the arm is then seated to the cam in a rest condition.

The simple configuration of the arm assembly lends itself to mass production and standardization, and replacement is facile and relatively inexpensive. Furthermore, adjustment and alignment is made easy and the necessary elements for such procedures are readily accessible.

BRIEF DESCRIPTION OF THE DRAWINGS

The foregoing and other objects, features and advantages of the invention will be apparent from the following more particular description of a preferred embodiment of the invention, as illustrated in the accompanying drawings.

In the drawings.

Similar numerals refer to similar elements throughout the drawing.

DESCRIPTION OF THE PREFERRED EMBODIMENT

Figures 1, 2, 3, 4:
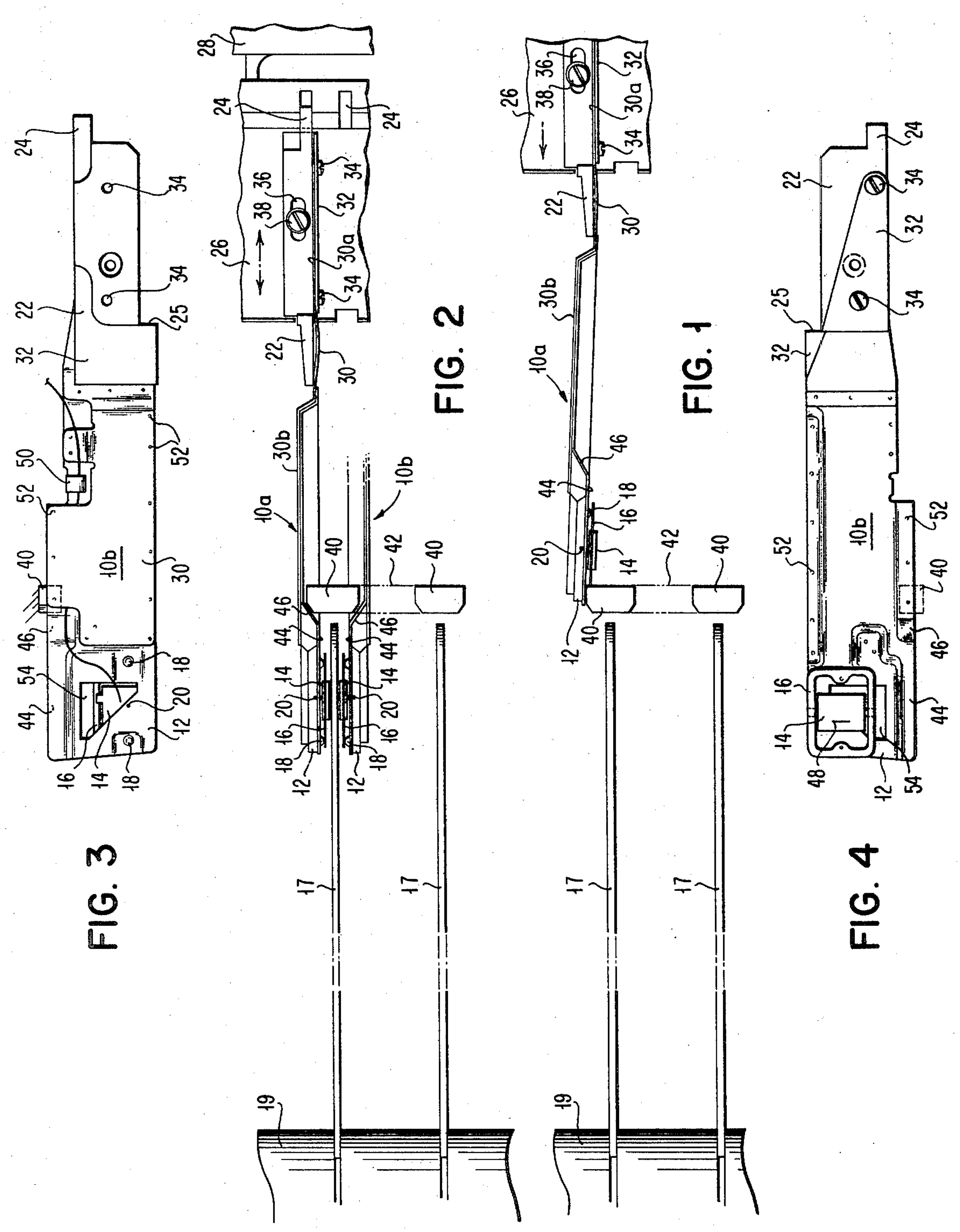
FIG. 1 is a side view of a magnetic head arm assembly, in accordance with this invention, and associated apparatus, partly broken away, depicting the assembly in a retracted position.
FIG. 2 is a side view of the magnetic head arm assembly and part of a second head arm assembly, both in an extended position, relative to a storage disc means.
FIG. 3 is a top plan view of the inventive magnetic head assembly, partially in breakaway.
FIG. 4 is a bottom plan view of the same head arm assembly depicted in FIG. 3.

With reference to FIG. 1, a magnetic head arm assembly 10 comprises a support 12 for a magnetic transducer or head shoe assembly 14, that is secured to a flexure 16, made of a flexible steel. During operation of the data processing apparatus, the flexure 16 acts as a gimbal that compensates for twist and roll of the arm assembly 10, so that the attitude and position of the head 14 is maintained virtually constant relative to the surface of a storage means, such as a magnetic disc 17. The flexure 16 is joined to the support 12 by weld buttons 18. A pin 20 is rigidly positioned at one end in the support 12, and at the other end is seated in a well formed in the head shoe 14 with freedom to move within the well. The pin 20 absorbs load effects and provides a suitable spacing between the head shoe 14 and the support structure 12.

The magnetic head arm assembly 10 also includes a rigid mount 22 having registration portions 24 and 25 that engage slots or grooves of a receiver structure 26. The receiver 26 is disposed substantially orthogonally and the slots or grooves are substantially parallel relative to the linear dimension of the arm assembly 10 and the plane of the disc means 17. The receiver 26 is movable bidirectionally in response to a drive means 28 (shown only in representation), which may be a voice coil actuator or linear DC motor that is energized by signals received from a central processing unit or computer, for example.

Coupled between the head support 12 and the mount 22 is a springlike element 30, that achieves proper head loading during operation of the data storage apparatus, in accordance with this invention. The springlike element 30, which is in the form of a leaf spring and functions in effect as a beam, has one portion **30*a* that is disposed adjacent to the lower surface of the mount 22, and is bent so that a second portion 30*b* abuts the top surface of the support structure 12. The portion 30*a* of the spring element is sandwiched between a clamp 32 and the mount 22 by means of two screws 34. The clamp 32 provides a fulcrum or fixed reference for the spring element 30. The screws 34 allow presetting and adjustment of the spring element 30, which in turn determines the position and alignment of the attached support 12 and head shoe 14 in both the linear and transverse directions. A fine adjustment of the linear position of the arm assembly 10 may be accomplished by means of a differential screw (not shown) disposed at the end of the mount 22. A slot 36 formed in the side of the mount structure 22 allows such linear adjustment and accommodates a locking screw 38 that holds the mount to the receiver 26**.

In operation, the arm assembly 10 is either in a retracted mode, as shown in FIG. 1, or in an advanced or extended mode for gliding head operation, as illustrated in FIG. 2. When retracted, the arm assembly 10 is seated on a cam 40, which is part of a stationary tower structure 42 embodying a series of cams 40 that are adapted to operate with similar arm assemblies. The cam 40 counteracts the loading force of the spring-loaded arm assembly 10 during the retraction or rest condition.

When the actuator 28 moves the receiver structure 26 from the retracted position, as in FIG. 1, to the extended position towards the disc 17, as in FIG. 2, a guide section 44, at one side of the head support 12 (see FIG. 4), follows the cam 40 towards the disc 17. The guide path of the support 12 includes a ramp section 46 that rides on the cam 40, and as the head support 12 descends the ramp 46, the head shoe 14 is depressed toward the surface of the rotating disc 17 by the force of the spring load. The disc means 17 rotates at a substantially constant speed on a spindle 19, and a laminar air flow is developed at each surface of the disc means. The spring element 30 operates to load the head 14 towards the disc 17, while the air bearing force supplied by the air flow adjacent to the disc surface provides an opposing hydrodynamic force or pressure to develop a spacing between the head and the disc, or a flying height for the head, which may be about 50 microinches, by way of example. In this manner, a noncontact transducing relation between the nonmagnetic transducing gap, that is formed in the magnetic core 48 of the head shoe 14, and the data tracks of the magnetic disc 17 is established.

When the head 14 scans the first, outermost track of the disc 17, the magnetic head 14 senses a prerecorded servo signal, which enables establishing the initial or home position. Address commands from a computer or processor are fed to the actuator 28 and cause the arm assembly 10 to be transported to precise track positions, so that the magnetic core 48 and its gap traverse a selected track for recording or reproducing data.

Various advantages and features are attainable with the simplified, compact design of this invention. For example, a simple coiled bracket 50 formed as an integral part of the head support structure 12 serves to clamp the lead wires coupled to the head coil. The spacing between the spring portion 30*b* and the support 12 provides a channel through which the wires are brought from the head shoe 14 to the wire retainer bracket 50. The bracket 50 also serves to eliminate any static charge that develops. As illustrated in FIGS. 3 and 4, the parts or elements of the arm assembly 10 are joined securely by small spot welds 52. The mass of the arm assembly is kept to a minimum by the use of cutouts and apertures, such as the triangular cutout 54 in the support structure 12. The minimal mass of the arm assembly 10 allows the use of a smaller actuator 28, affords quicker response and acceleration, and the compact design saves space as well as manufacturing cost.

As previously noted, a multiplicity of arm assemblies 10 may be joined to the receiver 26 for cooperation with a multiplicity of cams 40, which are arranged to form a collinear stationary stack or tower 42. In this manner, a multiplicity of head shoe assemblies 14 may be advanced or retracted simultaneously with reference to a plurality of storage discs. Since the arm assemblies are so designed and configured to afford standardization of manufacture and production, the head shoe assemblies 14 are all precisely positioned and aligned that they scan corresponding tracks of the discs, which are concentrically stacked to delineate a series of track cylinders.

In a successful embodiment of this invention, 20 head arm assemblies or sliders were utilized in combination with 10 discs in a disc pack. The springlike element 30 used with each assembly was formed from full hard stainless steel, type 304, and was 0.016 inch thick. The support structure 12 was made of one-quarter hard stainless steel. Each head was spring-loaded with a force of approximately 350 grams towards the disc surface, and a flying height of about 50 microinches was attained.

While the invention has been particularly shown and described with reference to a preferred embodiment thereof, it will be understood by those skilled in the art that the foregoing and other changes in form and details may be made therein without departing from the spirit and scope of the invention.

I claim:

1. An arm assembly forming an integral structure for automatically loading a magnetic transducer to a surface of a magnetic medium in response to movement of said transducer parallel to said surface comprising:

- a single leaf spring element biased to act continuously in a direction perpendicular to and toward said medium surface;
- means connected to one end of said element for supporting said transducer;
- means joined to the other end of said spring element for providing a fulcrum, said spring element having a predetermined spring constant so that the magnetic transducer is constantly urged toward the medium surface by virtue of the existing bias of the spring element; and
- means integral with said spring element adapted to move said one end perpendicular to and away from said surface when said arm is moved parallel to said surface.

2. An arm assembly as in claim 1, wherein said means integral with said spring element comprises a cam cooperating surface.

3. A random access magnetic disc file comprising:

- a plurality of disc record surfaces;
- a plurality of longitudinal magnetic head arm assemblies for accessing said disc surfaces, each of said magnetic head arm assemblies being formed with:
- a rigid mount element at one end of the arm assembly;
- a transducer support portion at the other end of the arm assembly, including a flexure on which the transducer is positioned for providing a gimbal action to said transducer, said flexure and transducer being located at one side of said arm assembly relative to the longitudinal axis;
- a ramp section formed at the other side of said arm assembly and in nonalignment with said flexure and transducer with reference to the longitudinal dimension of said arm assembly;
- a pretensioned leaf spring element coupled between said mount element and said transducer support portion, the spring element being sandwiched between a clamp and said mount, the clamp providing a fulcrum for said spring element; and
- a receiver structure having slots for engaging said rigid mounts of said head assemblies, said structure being movable bidirectionally and radially relative to said disc surfaces.

4. A random access magnetic disc file as in claim 3, including a stationary tower structure having a series of spaced cams aligned parallel to the axis along which said plurality of disc surfaces are coaxially mounted, so that as said receiver structure and the head arm assemblies are transported radially towards the disc record surfaces, said stationary cams cooperate with said ramp sections, thereby simultaneously loading said pretensioned arm assemblies to said record surfaces to a predetermined flying height.